US008059785B2

(12) United States Patent
Lee et al.

(10) Patent No.: US 8,059,785 B2
(45) Date of Patent: Nov. 15, 2011

(54) X-RAY TARGET ASSEMBLY AND METHODS FOR MANUFACTURING SAME

(75) Inventors: David S. K. Lee, Salt Lake City, UT (US); John E. Postman, Draper, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 931 days.

(21) Appl. No.: 11/851,333

(22) Filed: Sep. 6, 2007

(65) Prior Publication Data

US 2010/0266102 A1    Oct. 21, 2010

(51) Int. Cl.
*H01J 35/26* (2006.01)
(52) U.S. Cl. .......................................... 378/127; 378/144
(58) Field of Classification Search .................. 378/143, 378/144, 119, 121, 125, 127, 141
See application file for complete search history.

(56) References Cited

U.S. PATENT DOCUMENTS

| | | |
|---|---|---|
| 4,950,327 A | 8/1990 | Eck et al. |
| 5,102,747 A | 4/1992 | Kneringer et al. |
| 5,868,876 A | 2/1999 | Bianco et al. |
| 6,214,474 B1 | 4/2001 | Barbist et al. |
| 6,400,800 B1 | 6/2002 | Warren |
| 6,428,904 B2 | 8/2002 | Hasz et al. |
| 6,707,883 B1 * | 3/2004 | Tiearney et al. ............... 378/144 |
| 7,359,487 B1 * | 4/2008 | Newcome ...................... 378/143 |
| 2003/0006269 A1 | 1/2003 | Horner et al. |
| 2007/0119907 A1 | 5/2007 | Roedhammer |

OTHER PUBLICATIONS

European Search Report completed May 12, 2009 in connection with corresponding European Patent Application No. 08 25 3881.0.
Examination Report issued Aug. 10, 2010 in connection with corresponding European Patent Application No. 08 25 3881.0.

* cited by examiner

*Primary Examiner* — Courtney Thomas
(74) *Attorney, Agent, or Firm* — Maschoff Gilmore & Israelsen (57) ABSTRACT

The x-ray target assemblies have an oxide dispersion strengthened (ODS) refractory metal alloy substrate that is bonded to a carbon-containing heat sink. The x-ray target assemblies have excellent bonding between the substrate and the heat sink. The improved bonding is achieved by placing an oxide-free barrier layer between the ODS metal substrate and the heat sink. The oxide-free barrier layer minimizes or eliminates chemical reactions that would otherwise be possible between the dispersed oxides and the carbon-based heat sink during the manufacturing process. Preventing these undesired reactions while manufacturing the x-ray target assembly yields a device with improved bonding between the heat sink and the substrate, compared to devices manufactured without the barrier layer.

23 Claims, 4 Drawing Sheets

X-RAY TARGET ASSEMBLY AND METHODS FOR MANUFACTURING SAME

BACKGROUND OF THE INVENTION

1. Field of the Invention

The present invention relates generally to x-ray systems, devices, and related components. More particularly, embodiments of the invention relate to brazed x-ray target assemblies that include an oxide dispersion strengthened (ODS) alloy substrate and a carbon-based heat sink and methods for manufacturing such x-ray target assemblies and related devices.

2. Related Technology

The X-ray tube has become essential in medical diagnostic imaging, medical therapy, and various medical testing and material analysis industries. An x-ray tube typically includes a cathode assembly and an anode assembly disposed within an evacuated enclosure. The cathode assembly includes an electron source and the anode assembly includes a target surface that is oriented to receive electrons emitted by the electron source. During operation of the x-ray tube, an electric current is applied to the electron source, which causes electrons to be produced by thermionic emission. The electrons are then accelerated toward the target surface of the anode assembly by applying a high-voltage potential between the cathode assembly and the anode assembly. When the electrons strike the anode assembly target surface, the kinetic energy of the electrons causes the production of x-rays. Some of the x-rays so produced ultimately exit the x-ray tube through a window in the x-ray tube, and interact with a material sample, patient, or other object.

Stationary anode x-ray tubes employ a stationary anode assembly that maintains the anode target surface stationary with respect to the stream of electrons produced by the cathode assembly electron source. In contrast, rotary anode x-ray tubes employ a rotary anode assembly that rotates portions of the anode's target surface into and out of the stream of electrons produced by the cathode assembly electron source. The target surfaces of both stationary and rotary anode x-ray tubes are generally angled, or otherwise oriented, so as to maximize the amount of x-rays produced at the target surface that can exit the x-ray tube via a window in the x-ray tube.

In an X-ray tube device with a rotatable anode, the target has previously consisted of a disk made of a refractory metal such as tungsten, and the X-rays are generated by making the electron beam collide with this target, while the target is being rotated at high speed. Rotation of the target is achieved by driving the rotor provided on a support shaft extending from the target. Such an arrangement is typical of rotating X-ray tubes and has remained relatively unchanged in concept of operation since its induction.

The operating conditions for X-ray tubes have changed considerably in the recent decades. Due to continuous demands from radiologists for higher power from X-ray tubes, more and more tubes are using composite rotating anodes with tungsten-rhenium as a focal spot layer, molybdenum alloy as a substrate, and brazed graphite as a heat sink.

Increasing the power levels of the x-ray tube is typically accompanied by an increase in the operating temperatures of the anode, which, if high enough, may result in deformation of the molybdenum alloy substrate. Deformation in the substrate can cause large stresses in the metallurgical bond between the alloy substrate and the graphite heat sink. Should the stress exceed a threshold value, a complete debond of the graphite heat sink can result. The magnitude of this stress imposes a limit on the maximum size, rotational speed and highest allowable temperature of the alloy substrate.

To overcome the problem with deformation of molybdenum alloy substrates at elevated temperatures, other Mo-bearing alloys have been considered by x-ray target manufacturers. Oxide dispersion strengthened (ODS) Mo alloys currently show promising performance for reducing deformation of the substrate at high temperatures.

BRIEF SUMMARY OF THE INVENTION

Embodiments of the invention concern x-ray target assemblies for use as an anode in an x-ray device. The x-ray target assemblies of the invention have an oxide dispersion strengthened (ODS) refractory metal alloy substrate (e.g., ODS Mo alloy) that is bonded to a carbon-containing heat sink. Good bonding between the substrate and the heat sink is achieved by placing an oxide-free barrier layer between the ODS metal substrate and the heat sink. The oxide-free barrier layer advantageously minimizes or eliminates chemical reactions that would otherwise be possible between the dispersed oxides and the carbon-based heat sink during the manufacturing process. Preventing these undesired reactions while manufacturing the x-ray target assembly yields a device with improved bonding between the heat sink and the substrate, compared to devices manufactured without the barrier layer.

The present invention includes a method for manufacturing an x-ray target assembly having an ODS refractory metal substrate. In one embodiment, the method includes (i) providing an ODS refractory metal substrate (e.g., ODS Mo alloy), (ii) forming a barrier layer on the substrate, and (iii) brazing a carbon-containing heat sink to the barrier layer.

The substrates used in the x-ray targets of the invention can be made of any molybdenum or molybdenum alloy that has an oxide dispersed throughout to improve the thermal stability and/or strength of the alloy. In one embodiment, the primary metal component of the substrate is molybdenum or molybdenum alloyed with a proper amount of rhenium, titanium, zirconium, niobium, tantalum, hafnium, vanadium, or tungsten. The amount of alloying element can vary depending on solution strengthening effect of the element.

The ODS refractory metal alloy includes one or more oxides dispersed throughout the substrate to achieve the desired thermal stability and strength. Examples of suitable oxide compounds that can be dispersed in the refractory metal include, but are not limited to, lanthana ($La_2O_3$), yttria ($Y_2O_3$), ceria ($CeO_2$), thoria ($ThO_2$), and combinations of these. The oxide can be included in the refractory metal in a range from about 0.1 wt % to about 10 wt %, more preferably in a range from about 1 wt % to about 6 wt %, and most preferably in a range from about 2 wt % to about 4 wt % depending on production capability and performance requirements.

The barrier layer is a thin layer of metal coated on the substrate to prevent the oxides in the substrate from reacting with carbon in the heat sink during brazing. The material used to make the barrier layer is selected to be substantially free of the oxides in the substrate, and preferably free of any oxides. In one embodiment, the barrier layer can be substantially pure Mo, Ta, Re, W, Ti, Nb, V, Hf, Zr, or a Mo alloy of these. Alternatively, other applicable the barrier layer can be a carbide, nitride, boride, or silicide of these metals.

The barrier layer can be coated (i.e., formed) on the substrate using a deposition technique or a mechanical technique or other similar technique. In one embodiment the barrier layer is deposited on the substrate using plasma spray coating, salt-bath electrodeposition, electroplating, vacuum sputtering, melt evaporation, chemical vapor deposition, or a similar technique. Alternatively the barrier layer can be metallurgically bonded to the substrate using hot rolling, cold rolling, upset forging, hot isostatic pressing, cold isostatic pressing, or a similar technique.

The foregoing techniques allow the barrier layer to be made very thin. A thin barrier layer can be advantageous by minimizing the effect that the barrier layer has on the thermal stability and/or strength of the substrate, while still providing the desired barrier to reactions between the substrate and the carbon-containing heat sink. In one embodiment, the thickness of the barrier layer (e.g., Mo) is in a range from about 0.01 mm to about 2.5 mm, more preferably in a range from about 0.1 mm to about 1.5 mm, and most preferably in a range from about 0.25 mm to about 1 mm.

The carbon-containing heat sink is brazed to the substrate to form the target assembly. Any type of thermally conductive carbon-based heat sink can be used. Graphitic and/or composite carbon heat sinks are preferred for their durability and ability to conduct heat away from the substrate during use.

The heat sink can be brazed to the barrier layer using a braze that is compatible with the particular heat sink being used and the particular metals in the barrier layer. Examples of suitable brazes include, but are not limited to, Zr, Ti, V, Cr, Fe, Co, Ni, Pt, Rd, and Pd.

The x-ray target devices manufactured using the method of the present invention have surprisingly good bonding between the heat sink and the substrate compared to similar devices manufactured without a barrier layer. It is believed that the superior bonding in the x-ray target assemblies of the invention is achieved by reducing or eliminating the production of carbon oxide gases during the brazing process. The barrier layer keeps oxides in the ODS refractory metal away from the carbon heat sink during the brazing process, thereby preventing the oxides from reacting with carbon to form a gaseous carbon oxide. Preventing the formation of gases during brazing improves the quality of bonding.

These and other advantages and features of the invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

I. X-ray Target Assembly

Reference will now be made to the figures wherein like structures will be provided with like reference designations. It is understood that the drawings are diagrammatic and schematic representations of exemplary embodiments of the invention, and are not limiting of the present invention nor are they necessarily drawn to scale.

Figure 1:
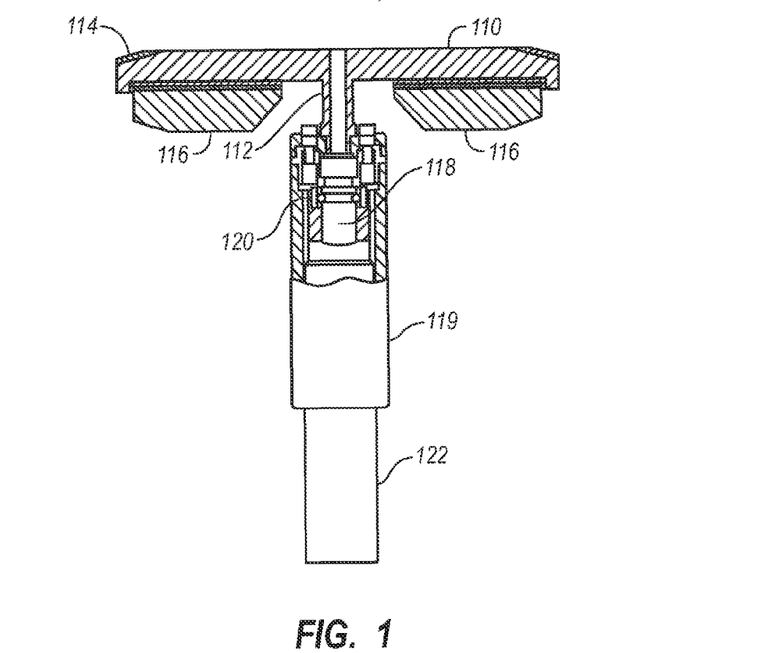
FIG. 1 is a cross-sectional view of an x-ray target assembly according to one embodiment of the invention.
Figure 2:
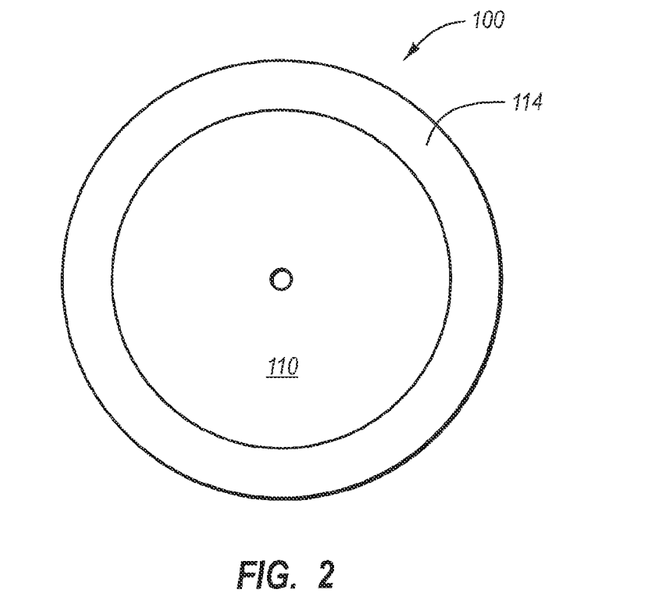
FIG. 2 is an end view of the x-ray target assembly of FIG. 1 showing the disk-like shape of the substrate and track.
Figure 3:
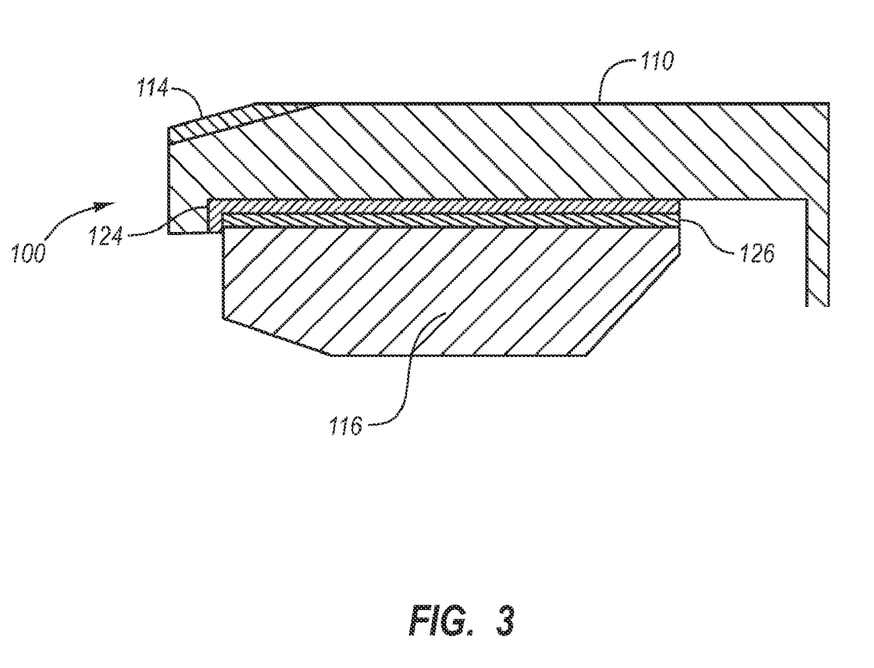
FIG. 3 is a partial cross-sectional view of the x-ray target assembly of FIG. 1 showing the barrier layer in more detail.

FIGS. 1-3 depict various features of embodiments of the present invention, which is generally directed to an x-ray tube device having a high performance rotating anode. Reference is first made to FIG. 1, which illustrates in cross-section a simplified structure of an example rotating-type x-ray target assembly 100. The x-ray target assembly 100 includes a target substrate 110 that is formed from an oxide dispersed strengthened molybdenum alloy. A stem 112 is integrally formed with the target substrate 110. A target focal track 114 is formed on the upper surface of the target substrate. Focal track 114 is typically made of a tungsten-rhenium alloy, although other materials can also be used. Electrons generated by a cathode (not shown) impinge on the focal track 114. The X-ray emitting metal of focal track 114 emits X-rays in response to the impingement of electrons. The target substrate 110 is backed by a heat sink 116, which is bonded to the substrate through various layers, which are discussed more fully below. Heat produced from the impingement of the electrons is mostly dissipated through heat sink 116. As shown in FIG. 2, in one embodiment, substrate 110 and focal track 114 can be shaped like a disk to facilitate high speed rotation.

The anode assembly 100 is rotated by an induction motor, which drives bearing sleeve 119 and bearing shaft 118. Bearing shaft 118 is connected to stem 112 and rotatably supported by bearings 120. Bearings 120 are housed in bearing housing 122, which supports the x-ray target assembly 100.

In a typical x-ray tube, the anode and cathode assemblies are sealed in a vacuum envelope. The stator portion of the motor is typically provided outside the vacuum envelope. The x-ray tube can is enclosed in a casing having a window for the X-rays that are generated to escape the tube. The casing can be filled with oil to absorb heat produced as a result of x-ray generation.

FIG. 3 shows a portion of the x-ray target assembly, illustrating substrate 110 and the heat sink 116 in greater detail and showing the interlayers that bond substrate 110 to the heat sink 116. As shown in FIG. 3, x-ray target assembly 100 includes a barrier layer 124 and a braze layer 126. Barrier layer 124 is positioned between substrate 110 and heat sink heat sink 116 to prevent chemical reactions between substrate 110 and heat sink 116 during brazing. The following describes the substrate, heat sink, and interlayers in more detail.

A. Substrate

Substrate 110 can have any shape suitable for use in an x-ray tube. To facilitate rotation, the substrate is preferably disk-like. The thickness of the substrate and shape is selected to maximize strength, heat dissipation, and ease of manufacturing while minimizing cost. In one embodiment, the substrate is substantially disk shaped and has a thickness in a range from about 10 mm to about 14 mm. Substrate 110 can be made from any oxide-dispersed-strengthened refractory metal (ODS refractory metal). In a preferred embodiment, the primary refractory metal is Mo. Molybdenum-based substrates have yielded exceptionally good substrates for use in rotating anode x-ray tubes.

In addition to the refractory metal, the substrate includes one or more inert metal oxides that are dispersed as fine particles throughout the refractory metal. Examples of suitable metal oxides that can be dispersed in the refractory metal include lanthana, yttria, ceria, and thoria, with lanthana being preferred.

The metal oxide compounds can be included in the refractory metal in any amount that yields a strengthened refractory metal substrate. In one embodiment, the weight percent of the metal oxide (e.g., La) in the ODS refractory metal is in a range from about 0.1 wt % to about 10 wt %, more preferably in a range from about 1.0 wt % to about 6 wt %, and most preferably in a range from about 2 wt % to about 4 wt %.

The grain size of the ODS refractory metal and the particle size of the metal oxides can have an effect on the properties of the substrate. In one embodiment, the grain size is in a range from about 10 to about 50 micrometers and the average diameter of the oxide particles is in a range from about 0.05 micrometers to about 5 micrometers.

The ODS refractory metals can be manufactured using any suitable method. In one embodiment of the invention, the ODS refractory metal can be manufactured by using the following steps: (a) forming a slurry of molybdenum oxide and an aqueous solution of a metal salt selected from nitrates or acetates of lanthanum, cerium, thorium, or yttria; (b) heating the slurry in a hydrogen atmosphere to produce a powder of molybdenum and the oxides of the metal salt; (c) mixing and cold isostatically pressing the powder; (d) sintering the powder from step (c) in a hydrogen atmosphere to produce a sintered product; and (e) thermomechanically processing the sintered product to a total reduction in cross-sectional area of about 60% to about 80% or even higher to produce about a 93%-99% dense molybdenum alloy containing an oxide dispersion.

The ODS refractory metals are typically provided as a powder. Substrate 110 can be manufactured from the powders using known powder metallurgy techniques.

Additional examples of suitable ODS Mo alloys and methods for making the ODS Mo alloys are disclosed in U.S. Pat. Nos. 4,950,327, 5,868,876, 6,707,883 which are incorporated herein by reference.

B. Heat Sink

The heat sink 116 is a carbon-based structure positioned on the substrate 110 so as to absorb heat generated from electrons impinging upon focal track 114, to create x-rays. Heat sink 116 is made of a thermoconductive material such as, but not limited to, graphite or thermally conductive carbon composite. During use, the heat sink absorbs thermal energy from the substrate and dissipates the heat. The heat sink can have any shape or size so long as the heat sink adequately dissipates heat and is suitable for rotating anodes. Typically the heat sink is disk-shaped to facilitate high speed rotation. The surface of the heat sink that faces the substrate can have a regular or irregular pattern of grooves to enhance the surface area that bonds with the substrate. In one embodiment, the pattern comprises concentric or phonographic grooves.

C. Barrier Layer

The barrier layer is a thin layer of a metal compound that separates the ODS refractory metal from the carbon-based heat sink. The barrier layer material is substantially free of the metal oxides that are present in the substrate and is preferably free of any oxides. The barrier layer can be made from a substantially pure metal. Examples of suitable metals include Mo, Ta, Re, W, Ti, Nb, V, Hf, Zr, and combinations of these. These compounds can also be used in combination with boron, silicon, nitrogen, or carbon in the form of metal borides, nitrides, silicides, carbides, or combinations of these.

Where a metal carbide is used as the barrier layer, the surface of the substrate can be chemically etched before depositing the carbide so as to remove oxides from the surface of the substrate, thereby preventing the oxides from reacting with the carbide.

In one embodiment, the barrier layer is made very thin to minimize the effect that the barrier layer has on the overall mechanical and chemical properties of the substrate. Since the barrier layer does not include the dispersed oxides, the barrier layer does not have some of the same properties as the oxide containing portion of the substrate. By using a thin layer, the overall properties of the substrate can retain the strength and thermal properties of the substrate. In one embodiment, the barrier layer has a thickness in a range from about 0.01 mm to about 2.5 mm, more preferably in a range from about 0.1 mm to about 1.5 mm, and most preferably in a range from about 0.25 mm to about 1.0 mm.

D. Braze layer

The braze layer is a layer of metal that bonds the surface of the carbon-containing heat sink to the substrate. The braze layer is formed by brazing (i.e., melting) a brazing material. At the interface of the heat sink and the braze layer, the braze layer takes the shape of the surface of the heat sink. In one embodiment, the heat sink has concentric rings or another grooved pattern that the braze layer fills to provide high surface area contact.

The braze layer is made from any brazing material compatible with brazing the carbon-based heat sink to the barrier layer. The brazing material is typically selected to have a melting point that is below that of the substrate. In one embodiment, the braze material and a component of the barrier layer form a diffused boundary. The diffused boundary can be formed by selecting a braze that melts at a temperature similar to at least one metal component in the barrier material. In one embodiment, the braze and the barrier material form a eutectic during brazing. Examples of suitable brazing materials include Zr, Ti, V, Cr, Fe, Co, Ni, Pt, Rd, and Pd.

II. Methods for Manufacturing X-ray Target Assembly

Embodiments of the invention also include methods for manufacturing an anode assembly. Methods for manufacturing the anode assembly according to the invention generally include (i) providing an x-ray target substrate having a deposited track, (ii) forming a barrier layer on at least a portion of the substrate on the opposite side as the track, and (iii) brazing a carbon-containing heat sink to the substrate.

The substrate can be provided in powder form or as a manufactured and/or machined piece. In the case where the substrate is provided in powder form, the manufacturing process of the invention yields a solidified solid structure having the desired shape (e.g., a disk shaped solid).

The barrier layer is formed on at least a portion of the substrate. Preferably the barrier layer covers the entire surface where the heat sink is to be attached. If desired, the barrier layer can cover the entire substrate (e.g., a W or W—Re substrate).

The barrier layer is formed on the substrate by either depositing a barrier layer material or by mechanically bonding a thin layer of barrier material to the substrate. Examples of suitable materials that can be deposited or mechanically bonded to the substrate include pure metals, borides, nitrides, silicides, or carbides of Mo, Ta, Re, W, Ti, Nb, V, Hf, Zr, and combinations of these.

To deposit the barrier material on the substrate, any deposition technique compatible with the barrier layer materials can be used. Examples of suitable deposition techniques include plasma spray coating, salt-bath electrodeposition, electroplating, vacuum sputtering, melt evaporation, chemical or physical vapor deposition, or a combination of these. The deposition technique is carried out so as to deposit the barrier layer material in the desired location and with a desired thickness. Those skilled in the art are familiar with the use of the foregoing techniques to deposit thin or thick layers of metals.

Where a carbide is used as the barrier material, it can be advantageous to remove oxides from the surface of the substrate before depositing the metal carbide compound. Removing oxides prevents the carbides from forming carbon oxides during the deposition process. Carbon oxides typically form gases that can cause poor bonding between the substrate and the barrier layer. The oxides on the surface of the substrate can be removed using chemical etching techniques known in the art.

In an alternative embodiment, a mechanical technique can be used to form the barrier layer. Examples of mechanical techniques that can be used to form the barrier layer include hot rolling, cold rolling, upset forging, hot isostatic pressing, cold isostatic pressing, and combinations thereof. In this embodiment, the barrier material can be provided as a thin sheet that is pressed onto the substrate.

In one embodiment, the barrier layer can be formed while simultaneously forming the substrate from a powder ODS refractory metal. In this embodiment, a three-dimensional piece of barrier material (e.g., a can) is used to hold the powdered ODS refractory metal. The substrate is then formed inside the barrier material using a technique such as isostatic pressing. In this embodiment, the barrier material encapsulates the substrate. If desired, the barrier material can be machined or otherwise worked to remove a portion of the barrier material.

In a subsequent step, the carbon heat sink is brazed to the substrate (i.e., to the barrier layer on the substrate). In one embodiment, the braze can be Ti, Zr, or a compound thereof. The barrier layer material, braze material, brazing temperature, and thickness of the barrier layer are selected to ensure that the braze will form a melt and bond the heat sink to the barrier layer, while preventing oxides in the ODS metal from coming into contact with the carbon substrate. The braze and barrier material can be selected such that the brazing temperature is below the melting point of the barrier material. In one embodiment, the barrier material has a melting point in a range from about 1600° C. to about 2000° C., alternatively in a range from about 1700° C. to about 1900° C. In some cases the melting point of the barrier layer can be in a range between about 2000° C. and 3900° C. (e.g., for W or TaC or ZrC materials).

The type of barrier material used can also affect the temperature need during brazing. In one embodiment, the materials are selected to form a eutectic, thereby allowing for brazing at relatively low temperatures. Alternatively, if the barrier material is a boride, nitride, silicide, or carbide, the brazing temperature may need to be close to the melting point of the braze. In addition, the particular barrier material selected should be thermodynamically stable above the melting point of the braze. For example, where Zr is used as a braze, the barrier material can be selected to be stable at a temperature above 1850° C., the melting point of Zr.

During the brazing process, the barrier material provides a physical barrier between the carbon atoms in the heat sink and the oxides in the ODS refractory metal of the substrate. During brazing, there is typically some diffusion of atoms at the boundary between the braze and other layers. By using a barrier layer that is substantially free of oxides, there are no oxides available to migrate through the braze to the boundary with the carbon heat sink when the braze is molten. Similarly, if carbon radicals diffuse from the boundary with the carbon heat sink to the boundary with the barrier layer, there will be no oxides that can form carbon oxide gases. By reducing and/or eliminating the formation of carbon oxide gases during brazing, the braze is able to form a good bond with the carbon heat sink and allows for a higher performance anode to be built.

The superior bonding of the carbon heat sink to the substrate allows for very large targets to be manufactured. In one embodiment, the target has a diameter of at least about 100 mm, more preferably at least about 150 mm and most preferably at least about 200 mm. Of course smaller diameters such as from 25-100 mm are also possible. Larger diameter targets are useful for making higher performance x-ray tubes.

III. Examples

The following provides an example of an x-ray target assembly and method according to one embodiment of the invention. An x-ray target assembly was manufactured from a substrate comprising an ODS Mo alloy. The ODS Mo alloy included 1 wt % $La_2O_3$ dispersed in Mo. The substrate was disk-shaped with an approximately 200 mm diameter. A W—Re track was deposited on the upper side of the substrate using a vacuum plasma spray process. A substantially pure Mo barrier layer of about 0.25 mm to 1 mm was deposited on the substrate using a vacuum plasma spray process.

Figure 4:
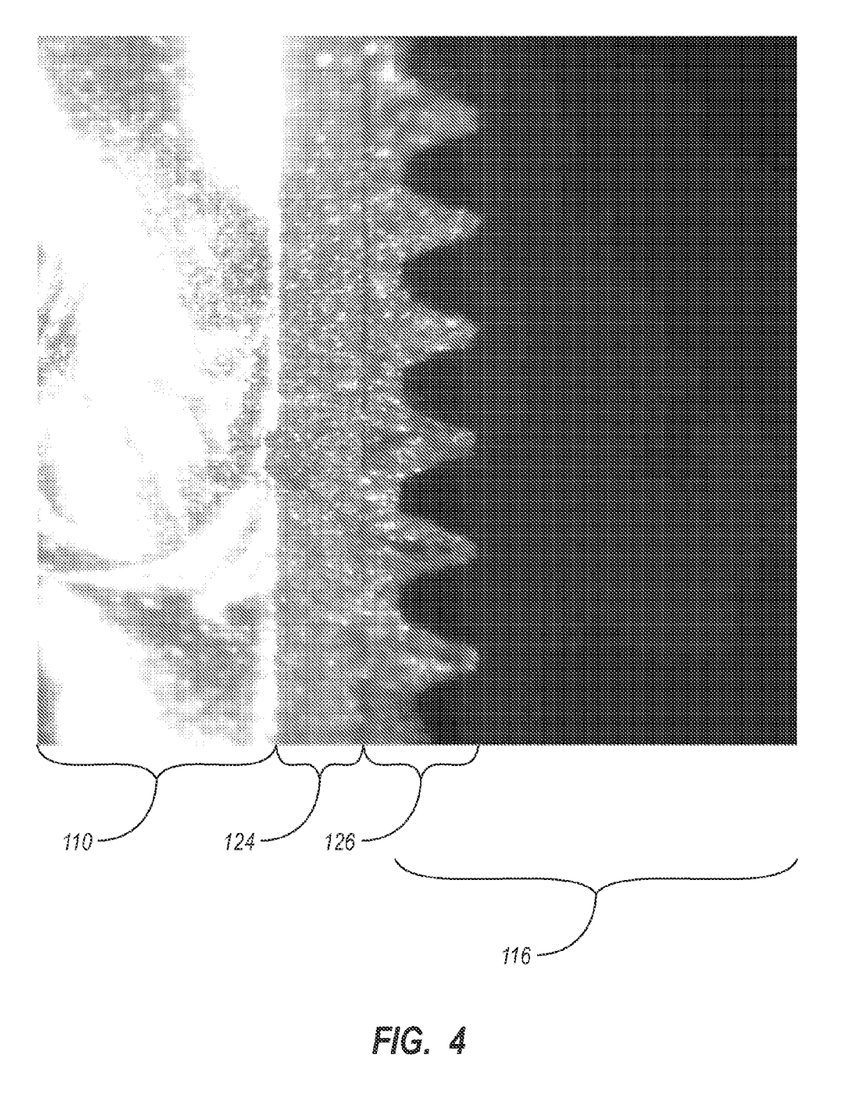
FIG. 4 is a high resolution photograph showing a cross section of a portion of an x-ray target assembly manufactured according to one embodiment of the invention.

A graphite heat sink with "record grooves" was brazed to the substrate using a Zr braze washer (thickness of ~0.25 mm). FIG. 4 is a high resolution picture of a cross section of the x-ray target assembly. The cross section was achieved by fracturing the substrate and heat sink. The specimen shows excellent brazing between the substrate and the carbon heat sink as evidenced by the Zr—Mo—C (ternary alloy) brazed layer with no bubbles within the well-defined "saw-tooth like" outline on the graphite side (i.e., cross-section of record groove) and straight boundary with the Mo barrier. In contrast, targets manufactured the same way except without a barrier layer showed significant spacing at the boundary between the braze and the heat sink, which resulted in debonded areas and poor performance of heat conduction into the heat sink. It is believed that the poor bonding in the devices made without the barrier layer was due to the formation of carbon oxide gas bubbles that prevented good bonding between the graphite and the ODS substrate.

IV. Use of Target Assembly in X-Ray Tube and CT-Scanner

Figure 5:
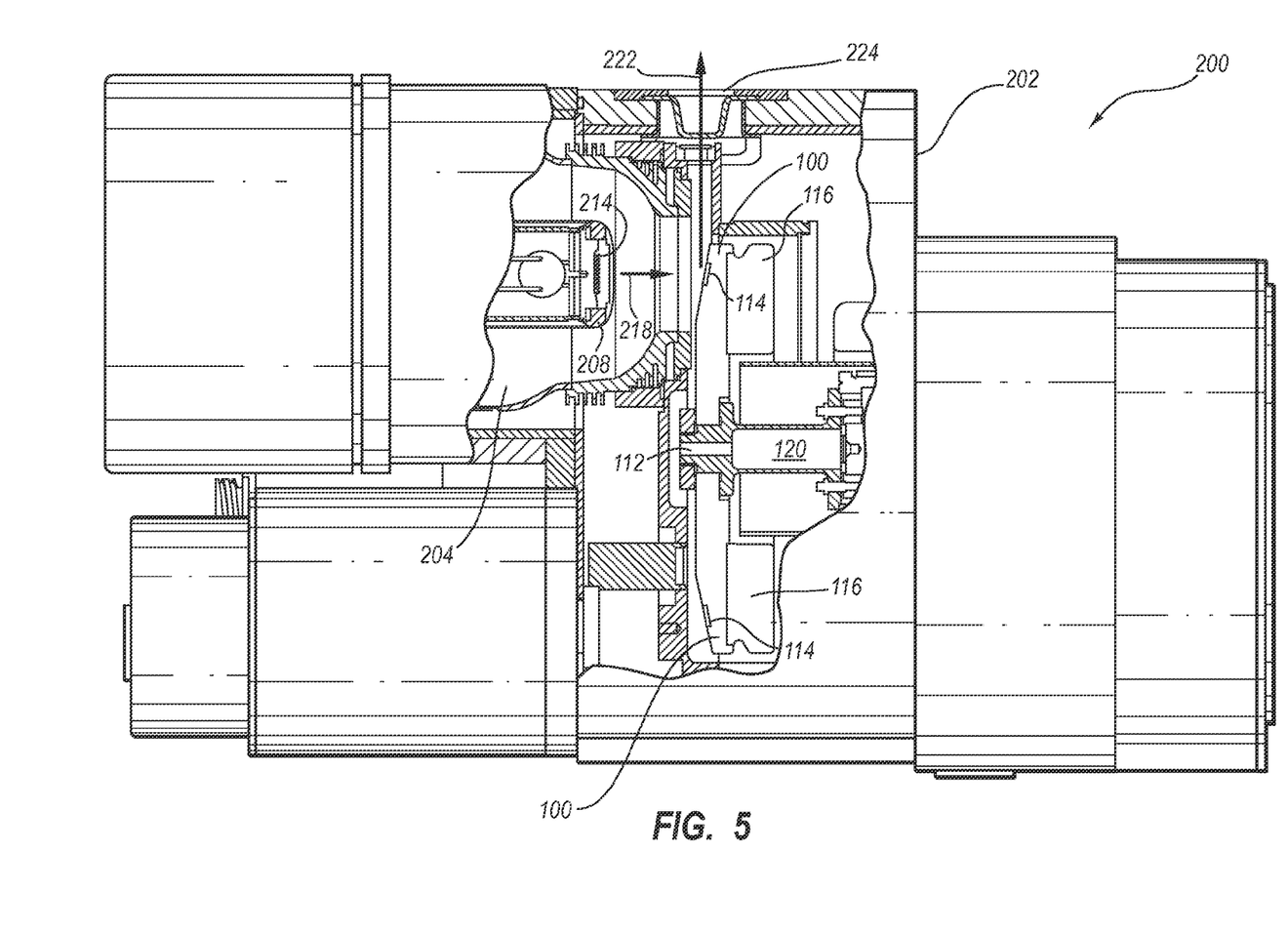
FIG. 5 is a partial cross-sectional view of an x-ray tube incorporating the x-ray target assembly of FIG. 1.

The x-ray target assemblies of the present invention can advantageously be incorporated into an x-ray tube. FIG. 5 illustrates an x-ray tube 200 that includes an outer housing 202, within which is disposed an evacuated enclosure 204. Disposed within evacuated enclosure 204 is a cathode 208 and a rotating anode 100, manufactured according to the present invention. Anode 100 is spaced apart from and oppositely disposed to cathode 208. Anode 100 is rotatably supported by bearing assembly 120.

As is typical, a high-voltage potential is provided between anode 100 and cathode 208. In the illustrated embodiment, cathode 208 is biased by a power source (not shown) to have a large negative voltage, while anode 100 is maintained at ground potential. In other embodiments, the cathode is biased with a negative voltage while the anode is biased with a positive voltage. Cathode 208 includes at least one filament 214 that is electrically connected to a high-voltage source. During operation, electrical current is passed through the filament 214 to cause electrons, designated at 218, to be emitted from cathode 208 by thermionic emission. Application of the high-voltage differential between anode 100 and cathode 208 then causes electrons 218 to accelerate from cathode filament 214 toward a focal track 114 that is positioned on a target surface of rotating anode 100.

As electrons 218 accelerate, they gain a substantial amount of kinetic energy, and upon striking the target material on focal track 114, some of this kinetic energy is converted into electromagnetic waves of very high frequency (i.e., x-rays). At least some of the emitted x-rays, designated at 222, are directed through x-ray transmissive window 224 disposed in outer housing 202. Window 224 is comprised of an x-ray transmissive material so as to enable the x-rays to pass through window 224 and exit x-ray tube 200. The x-rays exiting the tube 100 can then be directed for penetration into an object, such as a patient's body during a medical evaluation, or a sample for purposes of materials analysis.

The high performance and/or larger diameters of the x-ray target assemblies of the present invention make the x-ray target assemblies of the invention particularly suitable for use in high performance devices such as CT-scanners. CT-scanners incorporating the x-ray tubes of the invention can achieve higher intensity x-rays that allow for higher resolution spectroscopy. Thus, the CT-scanners of the invention can be made to detect material features that might not otherwise be possible with x-ray tubes having inferior performance. In addition, the improved bonding of the heat sink to the substrate improves the durability of the device, thereby lowering operating costs and/or avoiding downtime for repairs or maintenance.

The disclosed embodiments are to be considered in all respects only as exemplary and not restrictive. The scope of the invention is, therefore, indicated by the appended claims rather than by the foregoing disclosure. All changes which come within the meaning and range of equivalency of the claims are to be embraced within their scope.

What is claimed is:

1. An x-ray target assembly for use in a rotating anode assembly, comprising:
   a substrate comprising a refractory metal and one or more oxide compounds dispersed in the refractory metal;
   a heat sink comprising carbon;
   a barrier layer positioned between the substrate and heat sink, wherein the barrier layer is substantially free of the one or more oxide compounds that are dispersed in the refractory metal;
   a braze layer positioned between the heat sink and the barrier layer;
   wherein the barrier layer has a thickness that substantially prevents the one or more oxide compounds from reacting with the carbon in the heat sink, thereby reducing the formation of oxide gasses in an interface region between the substrate and the heat sink.

2. An x-ray target assembly as in claim 1, wherein the refractory metal is molybdenum or a molybdenum alloy.

3. An x-ray target assembly as in claim 1, wherein the barrier layer comprises a substantially pure metal, a boride, a silicide, a nitride, or a carbide of Mo, Ta, Re, W, Ti, Nb, V, Hf, or Zr, or a combination thereof.

4. An x-ray target assembly as in claim 1, wherein the barrier layer has a thickness in a range from about 0.01 mm to about 2.5 mm.

5. An x-ray target assembly as in claim 1, wherein the braze layer comprises Zr, Ti, V, Cr, Fe, Co, Ni, Pt, Rd, or Pd.

6. An x-ray target assembly as in claim 1, wherein the oxide compound comprises lanthana, yttria, ceria, thoria, or a combination thereof.

7. An x-ray target assembly as in claim 1, wherein the substrate is disk-shaped and further comprises a circular target track about a periphery of the substrate.

8. An x-ray target assembly as in claim 1, wherein the barrier layer and the substrate are directly bonded together and the barrier layer and the heat sink are bonded together by the braze.

9. An x-ray tube assembly comprising the x-ray target assembly of claim 1.

10. A high performance CT-scanner comprising the x-ray tube of claim 9.

11. A method for manufacturing an x-ray target assembly, comprising:
    providing a substrate comprising a refractory metal and one or more oxide compounds dispersed in the refractory metal;
    forming a target track on the substrate;
    forming a barrier layer on at least a portion of the substrate, the barrier layer comprising a material that is substantially free of the one or more oxide compounds that are dispersed in the refractory metal; and
    brazing a carbon-based heat sink to the barrier layer such that the barrier layer substantially prevents the one or more oxide compounds from reacting with the carbon in the heat sink during the brazing step, thereby reducing the formation of oxide gasses in an interface region between the substrate and the heat sink.

12. A method as in claim 11, wherein the refractory metal is Mo.

13. A method as in claim 11, wherein the barrier material is deposited on the substrate using a technique selected from the group consisting of plasma spray coating, salt-bath electrodeposition, electroplating, vacuum sputtering, melt evaporation, chemical vapor deposition, physical vapor deposition, or a combination thereof.

14. A method as in claim 11, wherein the barrier material is metullurgically bonded to the substrate using a technique selected from the group consisting of hot rolling, cold rolling, upset forging, hot isostatic pressing, cold isostatic pressing, and combinations thereof.

15. A method as in claim 11, wherein the oxide compound comprises lanthana, yttria, ceria, thoria, or a combination thereof.

16. A method as in claim 11, wherein the heat sink comprises graphite or a carbon composite.

17. A method as in claim 11, wherein the barrier layer comprises Mo, Ta, Re, W, Ti, Nb, V, Hf, Zr, or combinations thereof.

18. An x-ray tube comprising an x-ray target manufactured according to the method of claim 11.

19. A method for manufacturing a x-ray target assembly, comprising:
    providing a substrate comprising an oxide dispersion strengthened (ODS) Mo alloy;
    forming a target track on the substrate;
    coating at least a portion of the substrate with a layer of a substantially pure metal or metal alloy selected from the group consisting of Mo, Ta, Re, W, Ti, Nb, V, Hf, Zr, or a Mo alloy thereof;
    outgas sing the coated substrate; and
    brazing a graphite disk to the outgassed coated substrate using a braze comprising Zr, Ti, V, Cr, Fe, Co, Ni, Pt, Rd, or Pd, wherein the coating has a thickness that substantially prevents oxides present within the oxide dispersion strengthened (ODS) Mo alloy from reacting with carbon in the graphite disk, thereby reducing the formation of oxide gasses in an interface region between the substrate and the heat sink.

20. A method as in claim 19, wherein the oxide-free barrier layer is deposited on the substrate using a technique selected from the group consisting of plasma spray coating, salt-bath electrodeposition, electroplating, vacuum sputtering, melt evaporation, chemical vapor deposition, physical vapor deposition, or a combination thereof.

21. A method as in claim 19, wherein the oxide-free barrier layer is mechanically adhered to the substrate using a technique selected from the group consisting of hot rolling, cold rolling, upset forging, hot isostatic pressing, cold isostatic pressing, and combinations thereof.

22. A method as in claim 19, wherein the ODS Mo alloy comprises an oxide of lanthana, yttria, ceria, thoria, or a combination thereof.

23. An x-ray tube comprising an x-ray target manufactured according to the method of claim 19.

* * * * *